United States Patent [19]

Watson

[11] Patent Number: 4,488,807

[45] Date of Patent: Dec. 18, 1984

[54] LIGHT VALVE/FADER AND CONTROL CIRCUIT

[75] Inventor: Charles J. Watson, Dunwoody, Ga.

[73] Assignee: Bell & Howell Company, Chicago, Ill.

[21] Appl. No.: 401,199

[22] Filed: Jul. 23, 1982

[51] Int. Cl.³ .................... G03B 21/36; G03B 27/78
[52] U.S. Cl. .......................................... 355/83; 355/88
[58] Field of Search ................... 355/71, 78, 83, 88; 352/91 R

[56] References Cited

U.S. PATENT DOCUMENTS

| | | | |
|---|---|---|---|
| 3,454,328 | 7/1969 | Engel | 355/78 |
| 3,502,409 | 3/1970 | Balint et al. | 355/88 |
| 3,533,693 | 10/1970 | Balint | 355/88 |
| 3,552,852 | 1/1971 | Stemke et al. | 355/71 X |
| 4,009,959 | 3/1977 | Watson et al. | 352/91 X |
| 4,045,136 | 8/1977 | Watson et al. | 355/88 X |
| 4,072,419 | 2/1978 | Watson et al. | 355/83 |
| 4,108,537 | 8/1978 | Watson et al. | 355/88 |
| 4,180,321 | 12/1979 | Langrehr et al. | 355/88 X |

Primary Examiner—L. T. Hix
Assistant Examiner—Douglas S. Lee
Attorney, Agent, or Firm—McDermott, Will & Emery

[57] ABSTRACT

A photographic printer light valve/fader control circuit may convert control data for conventional automatic solenoid driven photographic printer light valves to control data for high speed and reliable electronic photographic printer light valves and faders. The circuit is adapted to retrofit printers designed for existing solenoid driven devices and to convert the color and fade control signals received from a conventional paper tape reader to a form useful for electronic control of the angularly adjustable light valve vanes. The vanes adjust the mix of red, green and blue light in the resulting print and control fades, lap dissolves and the like. The color correction signals, received from the paper tape reader in a quasi-binary format, are converted into a conventional binary format and inputted at the proper time to two digital to analog converters which convert these signals into a form useful in controlling the angle of the vanes. The signals from the two digital to analog controllers are multiplied and fed to a servo-amplifier to adjust the vane position in accordance with the desired color mix and fade characteristics. A feedback potentiometer is mounted directly adjacent the motor, on the motor shaft, to minimize backlash. In addition, the light valves are identical and include three position switches to enable them to select information relating to only one of three colors when the valves are sequentially addressed.

6 Claims, 4 Drawing Figures

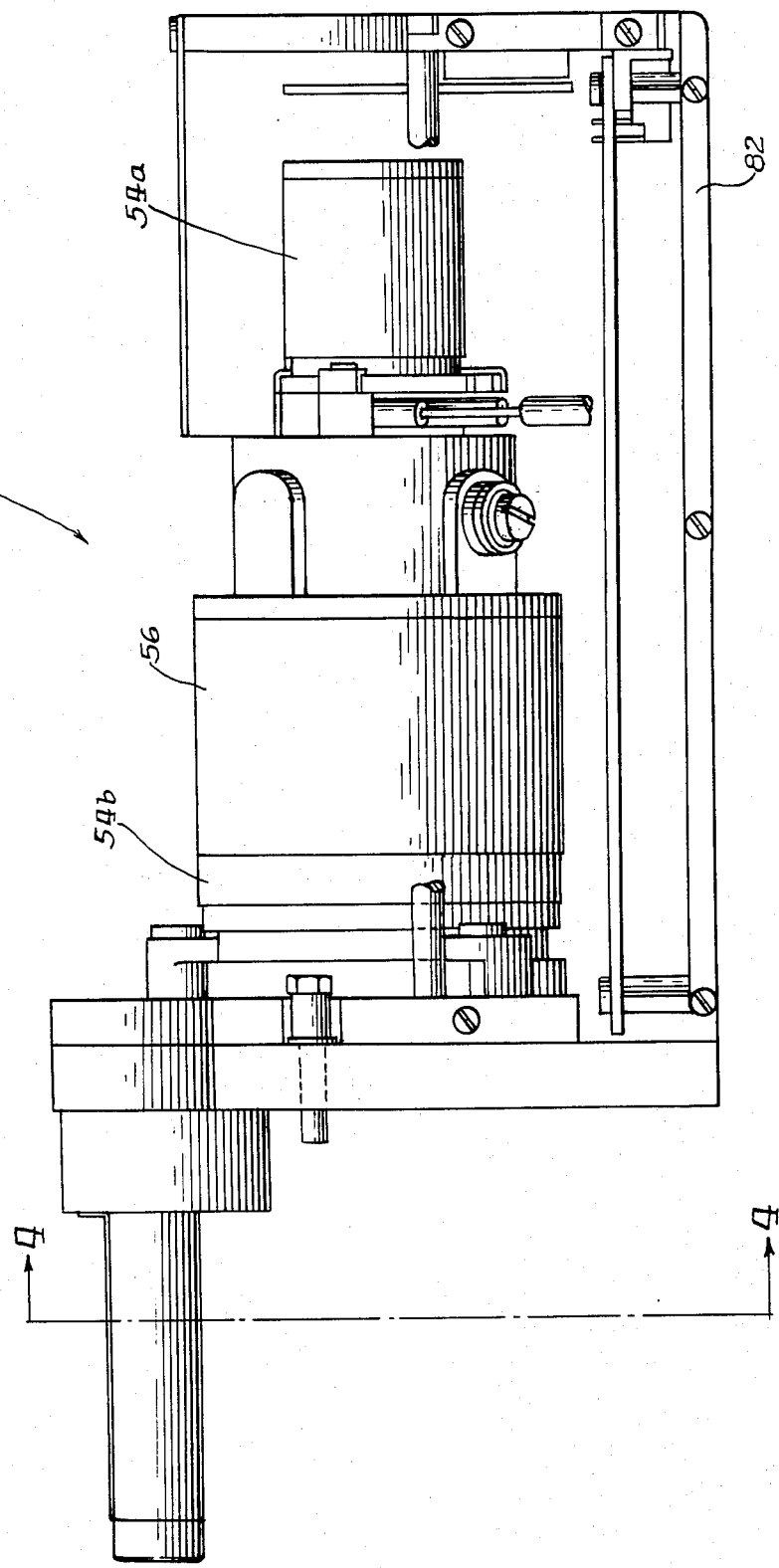

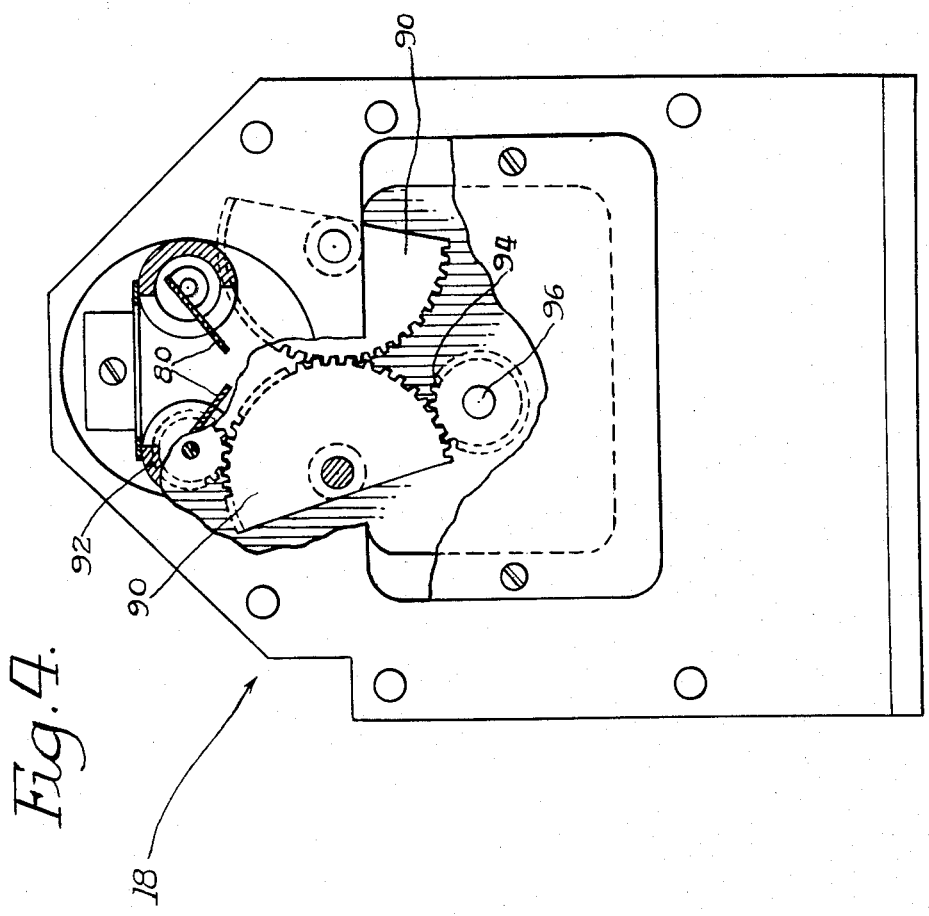

LIGHT VALVE/FADER AND CONTROL CIRCUIT

BACKGROUND OF THE INVENTION

1. Field of the Invention

This invention relates generally to control circuits for photographic printers which are capable of automatically adjusting the color content and fade characteristics of the print.

2. Background Art

Automatic additive color photographic printers have gained widespread acceptance throughout the industry. These printers generally utilize solenoid driven light valves wherein the desired color characteristics of each scene to be printed are encoded in a paper tape so that as the film is printed the desired colored corrections are automatically incorporated. These devices utilizes a spectral light source, split into red, green and blue beams, whereby light valves along the path of these various light beams control the amount of light of each particular color used to expose the final print. Conventionally these light valves utilize a pair of opposed vanes whose angular position can be adjusted by a bar-type adder unit to vary the intensity of the light beam passing aperture between them.

The bar-type adder unit includes a plurality of solenoid actuated slides that store the desired vane position signals from the light valve punched tape. These signals represent the selected intensity and hue correction factors to be applied to the slide solenoid causing the adder unit to expand linearly by an amount corresponding to the desired correction. The information in the adder unit is converted to an angular rotation of a vane memory cam and stored in this form. The angular position of the vane memory cam is transferred to the vanes on receipt of a cue signal by actuating a vane solenoid that moves a vane into the path of a particular color light beam in an amount determined by the angular position of the vane storage memory cam. Therefore in response to a cue signal, the color information stored in the memory is transferred to its respective vane, and the valve adder is cleared by an "unlatched pulse" to receive the information corresponding to the next scene to be printed. A highly successful system of this type is described in U.S. Pat. Nos. 3,454,328 to Engel, and 3,502,409 and 3,533,693 both to Balint, all three patents assigned to the assignee of the present invention.

More recently automatic photographic printers which utilize electronic rather than solenoid control have been devised to provide more accurate and rapid adjustment of the vane position. Systems of this type are disclosed in U.S. Pat. Nos. 4,045,136 and 4,108,537 both assigned to the assignee of the present invention. These devices use a programmable electronic control system for driving the light valves in accordance with programmed color balance and intensity information. However the apparatus taught in U.S. Pat. No. 4,045,136 uses the conventional light values with bar-type adders to adjust the vane position while U.S. Pat. No. 4,108,537 uses electronic control of a PLZT cell to vary the primary light beams.

In addition electronic exposure control systems for use in photographic printers which provide fade-in, fade-out, lap dissolve or other special effects by varying the printing beam intensity in response to information supplied from a tape reader have been disclosed in the art. An exemplary system of this type is described in U.S. Pat. No. 4,009,959, assigned to the assignee of the present invention.

Despite the variety of advanced systems available, the basic solenoid driven light valve systems are still extremely popular. It may be that the high cost incurred in initially purchasing these systems is partly responsible for the reluctance to switch to more advanced techniques.

SUMMARY OF THE INVENTION

It is a primary object of the present invention to provide an apparatus for converting printers with existing solenoid driven light valve systems to electonically controlled light valve apparatus with fade control.

It is another object of the present invention to provide an electronically operated servo system for controlling vane position.

These and other advantages of the present invention are achieved by a photographic printer control circuit for converting a film printer that uses solenoids to adjust the position of vanes within a light source path in order to vary the mix of red, green and blue light, to an electronically controlled film printer. The circuit includes means for temporarily storing a plurality of color coded signals imputted from a tape reader. Means are also provided for permanently storing a plurality of commands useful for converting solenoid driven light valve signals to signals suitable for electronic light valve control. The permanent storage means includes means for converting the quasi-binary color signals received from the paper tape reader to true binary format. Initiating means cause the execution of the color control signals by the light valve vanes. A digital to analog conversion means converts the true binary coded signals to analog position control signals useful in positioning the light valve vanes in accordance with the instructions received from the paper tape reader.

BRIEF DESCRIPTION OF THE DRAWING

FIG. 3 is a side elevational view of a light valve useful in the embodiment shown in FIG. 1; and FIG. 4 is an enlarged, partially cut away cross-sectional view taken generally along the line 4—4 in FIG. 3.

DETAILED DESCRIPTION OF THE PREFERRED EMBODIMENT

Figure 1:
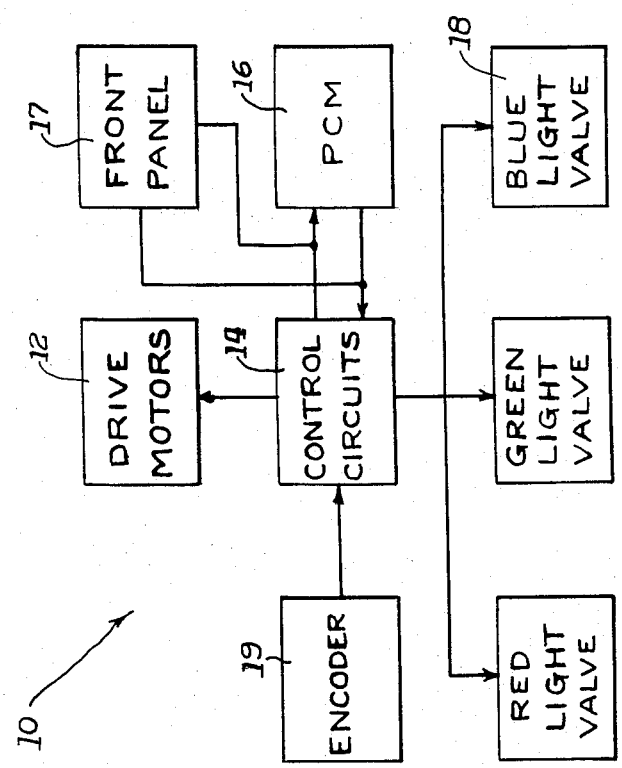
FIG. 1 is a simplified schematic view of one embodiment of the present invention.

Referring to the drawing wherein like reference characters are used for like parts throughout the several views, an automatic photographic printer 10, shown in FIG. 1 includes the drive motors 12, a control circuit 14, a printer control memory (PCM) unit 16, a front panel 17, light valves 18 and an encoder 19. This arrangement implements an additive color printer system, and other systems of this type are described in U.S. Pat. Nos. 3,502,409 and 3,533,693, both hereby expressly incorporated by reference herein.

Briefly, the printer 10 uses a lamp or other light source (not shown), a plurality of dichroic mirrors (not shown), a suitable lens system (not shown), and three sets of vanes (not shown) to split the white light from the light source into red, green, and blue light beams. The intensity of each of these colored light beams is adjusted by the various light valves 18 prior to recombination so that the resulting print is exposed in the desired light mixture. A negative and raw stock are moved past the lens system by a suitable transport system driven by the drive motors 12. The PCM unit 16 provides a step by step execution of information from a prepunched paper tape read by a paper tape reader, thereby eventually setting the light valves 18 in accordance with correction data sensed from a punched tape.

Figure 2:
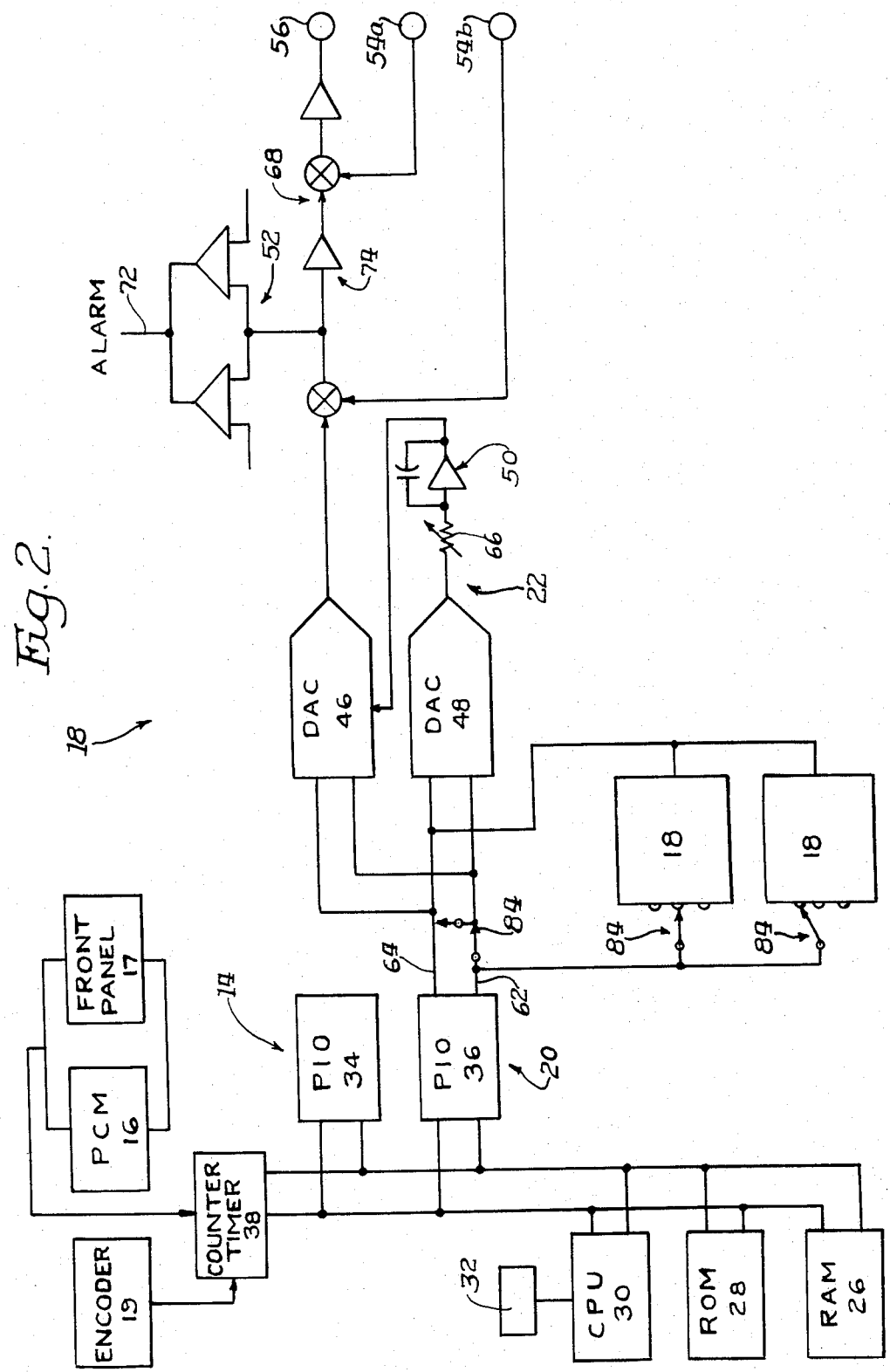
FIG. 2 is an electrical schematic showing the control circuit for the embodiment of the present invention shown in FIG. 1.

Referring now to FIG. 2, the control circuit 14 includes an interface circuit 20 connected to an electronic exposure and color control circuit 22 in each light valve 18. The interface circuit 20 includes a volatile memory 26, a nonvolatile memory 28, a central processing unit 30, a clock 32, a pair of parallel input and output devices 34 and 36, and a counter/timer 38. The interface circuit 20 receives inputs from the PCM unit 16, the encoder 19, and the front panel 17 and provides the appropriate output, in accordance with those inputs, to the electronic exposure and color control circuit 22.

Input color and fade control signals come from both the PCM unit 16 and the front panel 17. A suitable PCM unit 16 for use herein is described in U.S. Pat. Nos. 4,045,136 and 4,180,321, both assigned to the assignee of the present invention, and both expressly incorporated by reference herein. The PCM unit 16, in accordance with tape coding, initially determines whether the tape to read by the unit 16 is a color tape containing only color information, whether separate color and cuing tapes are to be utilized or whether a composite tape with color and cue information it to be read. A tape reader within the PCM unit 16 decodes a prepunched pattern of apertures on a tape and from that information derives signals which eventually are translated into color correction signals and fade control signals. The PCM unit 16 then loads the contents of the tape or tapes into a microprocessor memory for execution at the appropriate time to make the necessary printing adjustments.

Conventionally the punched tape is eight channels wide and punched with four rows or steps carrying the lighting information for a single scene. The first row or step is generally blank with the exception of the first scene. Serving to indicate the start of the first scene, the eighth channel of the first row of the film scene carries a single hole. The second, third and fourth rows respectively carry information relating to the red, green and blue intensity values.

While a variety of cuing systems can be used, a conventional frame count cuing system included internally in the PCM unit 16 conveniently continuously monitors the quantity of film as it passes through the printer and provides an output cue signal to actuate the light valves 18. Scene length information or frame address information may be provided to the frame count cuer by a separate frame address information tape read by the frame count cuer. When the frame count cuer detects the occurrence of a particular frame or the end of a scene length it generates a cue signal. A suitable external frame count cuer for use herein disclosed in U.S. Pat. No. 4,072,419, assigned to the assignee of the present invention and expressly incorporated by reference herein in full, while a similar internal frame count cuing system suitable for use herein is disclosed in U.S. Pat. No. 4,045,136 patent already incorporated herein.

The PCM unit 16 produces the appropriate color correction signals to the PIO 34 in the form of a "slide" signal for each light valve 18. In addition, the PCM unit 16 produces a "vane" signal which is recorded by the counter/timer 38 to enable the operator to be informed of the number of cue signals or color light changes that have been performed and to alert the interface circuit 20 to search for sequenced color slide information and record this data as received from the PCM unit 16. Finally, the PCM unit 16 produces 5 volt signals for fade control.

The encoder 19 together with the counter/timer 38 provide the necessary count information to correlate the execution of proper fade lengths for all machine speeds. The encoder 19 includes a device (not shown) connected to the mechanical drive train of the printer and produces a given number of pulses per revolution of the drive train, related to the quantity and direction of the film drawn across the printer exposure aperture. These pulses are fed to the counter/timer 38 which counts the pulses and prepares the information for use by the central processing unit 30 and storage in the volatile memory 26.

A variety of manual inputs may be received by the interface circuit 20 from the front panel 17. Trim information may be inputted from conventional trim switches to adjust the hue on a continuing or generalized basis. The particular fade curve appropriate for the film being used may be inputted as well. In addition a "vane open", "manual fade" or a fade change test may be instructed using controls on the front panel 17. The front panel 17 also includes displays indicated cue counter pulses, fader pulses, and a fader status condition.

The volatile memory 26 is used to store machine and program status information while the non-volatile memory 28 stores the instructional sequence used to control the operation of the interface circuit 20. The two parallel input output devices 34 and 36 transmit inputs to the various light valves 18. Namely the device 36 sends coded information to the light valve from the front panel trim switches together with information from the PCM 16.

Since the color correction information received from the PCM unit 16 is in the form of quasi- binary signals, weighted 20, 16, 8, 4, 2, 1, these signals must be converted to true binary code, weighted 32, 16, 8, 4, 2, 1, to enable electronic control by the electronic exposure and color control circuit 22 of each light valve 18. This is accomplished according to the command sequence stored in the non-volatile memory 28 in conjunction with the central processing unit 30 and the volatile memory 26. The result is the production of 5 volt DC signals which are sent directly to the exposure and color control circuit 22. This is to be contrasted with prior devices of this kind which convert the quasi-binary signals into 115 volt DC signals for controlling the light valves 18.

The electronic exposure and color control circuit 22 includes a light valve digital to analog converter (DAC) 46, a fader digital to analog converter 48, a variable integrator 50, an error detector 52, and a pair of feed back sensors 54. Each DAC 46 or 48 includes a data register for storing the desired color or fade commands from the interface circuit 20. In general terms, the circuit 22 converts the digital signals received from the interface circuit 20 into analog signals useful in adjusting the angular position of the light valve vanes through the operation of the vane motors 56. The rotation of the vane motors 56 is sensed by a tachometer 54a and a position feedback sensor 54b so that the velocity and position of the vanes can be adjusted by servo-control. Velocity feedback is useful in avoiding acceleration related deviations from the desired fade characteristic. Electronic light valve control is described in U.S. Pat. Nos. 4,045,136 and 4,108,537 both assigned to the assignee of the present invention and expressly incorporated by reference herein in full.

Each light valve digital to analog converter 46 receives color selection control signals on the line 62 and data input signals on the line 64 from the parallel input output controller 36. The DAC 46 adjusts the color data in the event that a fade-in or fade-out operation is to be performed. The fader digital to analog converter 48 is also connected to the lines 62 and 64 and provides a digital reference signal for the light valve DAC 46 in response to fade select and fade data signals. The output of the fader DAC 48 is integrated by the variable integrator 50 in accordance with the speed of printer operation and the particular fade length desired to provide a smooth control function. The selected fade length is set on the integrator 50 through the variable resistor 66. The control command forwarded to the servo amplifier 68 is then the result of the product of the two signals inputted to the DAC 16 from the DAC 48 and circuit 20.

The data on the data line 64 provides color correction information for red, green and blue color correction which is supplemented by manually preset data from red, green and blue trim controls on the front panel 17. The trim controls permit selective biasing of the various channels to compensate for raw stock emulsion and chemical processing variables.

The desired fade characteristics are provided by the fader digital to analog converter 48 in accordance with the information received from the PCM 16 together with preprogrammed exposure curves for particular film formats as well as exposure curves for special effects, stored in the non-volatile memory 28. A suitable exposure control device for use herein is disclosed and described in U.S. Pat. No. 4,009,959, hereby expressly incorporated by reference herein. The fader DAC 48 receives information from the non-volatile memory 28 in the form of a particular film exposure characteristic curve for the particular film being printed. The output of the DAC 48 is integrated and passed to the DAC 46 to reduce the output of the DAC 46 in the case of a fade-in in accordance with the programmed film exposure characteristic curve. Thus the output of the DAC 46 is modified when the fader is actuated, independently of the data input. When the fader is not in operation, as in normal printing of a particular scene, the DAC 46, in effect, provides the unity multiplication to the output of the DAC 46.

In either 16 mm or 35 mm film format application the encoder 19 pulses are related directly to the quantity of the film transported through the printer. In the case of 35 mm raw stock and preprint film, 60 pulses are generated for each film frame passing through the printer. In the case of 16 mm raw stock and preprint film, 24 pulses are generated for each film frame. Therefore, in order to provide adaptability to both film formats, the CPU 30 and memory 28 function to divide the input pulses from the counter/timer 38 by five when using 35 mm film or by two when using 16 mm film. A conventional toggle switch (not shown) is provided for manual positioning for either 35 mm or 16 mm to provide the appropriate divider, i.e., five for 35 mm or two for 16 mm. Thus, for a particular fade length in number of frames, the manual divider provides a constant output for either 35 mm film or 16 mm film when using the appropriate divider. According to the possible fade lengths between 16 frames and 96 frames, the appropriate divider for either 35 mm film or 16 mm film will be, 2 for a 16 frame fade, 3 for a 24 frame fade, 4 for a 32 frame fade, 6 for a 48 frame fade, 8 for a 64 frame fade or 12 for a 96 frame fade. When the appropriate divider for a particular fade length is supplied, the output signal therefrom will provide 96 pulses for the entire fade length for any fade length between 16 frames and 96 frames.

The error detector circuit 52 is connected at the output of the DAC 46 to provide a fail safe alarm signal on the line 72 in the event that the system fails to null out the servo amplifier 68 feed-back loop. The circuit 52 includes pulse and minus reference voltages for a range of permissible error by amplifiers 74 which activate an alarm if the error reaches a set predetermined level.

As shown in FIG. 3, each light valve 18 includes a pair of opposed vanes 80, a motor 56, a tachometer 54a and a position feedback sensor 54b, all mounted on a common frame 82. The sensor 54b, preferably a precision conductive film potentiometer, is mounted adjacent the motor 56 and positioned directly on the motor shaft 96. This mounting arrangement and the close proximity between the potentiometer 54b and the motor 56, advantageously a low inertia moving motor, enables very precise control over the operation of the vanes 80 and minimizes vane "bounce" or "backlash". Specifically, as shown in FIG. 4, the vanes 80 are driven by a pair of meshing fragmentary gears 90 that engage gear portions 92 on the vanes 80. One of the gears 90, in turn, drivingly meshes with the gear 94 on the motor shaft 96.

Each of the three light valves 18 is connected to the control circuit 14 through a common bus 83 and three position switch 84. The switch 84 enables each light valve 18 to utilize multiplexed information relating to only one of the three primary colors. Thus, each light valve 18 is sequentially addressed and provided with the appropriate color correction information. However, each valve 18 only uses information relating to the color to which it is keyed according to the state of its switch 84. The state of each switch 84 determines whether it is the red, green or blue select signal which is routed by the switch 84 to the DAC 46. In accordance with this select signal, the DAC 46 selects the data on the data line 64 related to the selected color. Since each valve 18 is completely identical, considerable cost of manufacturing savings can be achieved. In addition, fewer wiring interconnections between the circuit 14 and each light valve are required since the information relating all three colors can be sent to each valve 18, the valve thereafter utilizing only the appropriate information corresponding to one of the three colors. In addition, separate valve drive boards are not needed for each value and power consumption is substantially reduced as a result.

As a result of the rapid response of the specific elements used, the control system when used with the electronic control system described permits rapid printing of light color changes at, or within, a frame line even with high printing speed. The control system in combination with an exposure control circuit provides bidirectional fading with variable film exposure characteristics.

With the present system, control signals for existing solenoid driven systems are converted to control signals for electronic systems using the control signals associated with the solenoid systems to produce an improved result. The vane signal is sensed by the light valve interface circuit 20 and initiates the execution of values preloaded into the DAC data register. The vane signal is produced by the PCM unit 16, and initiates a timing sequence of the red, blue, and green slide information from the PCM unit 16, in the program running the interface circuit 20. Color correction signals in the form of sequential "slide" signals are then sent by the PCM unit 16 to each of the light valves 18 via the control circuit 20. Cue signals cause execution of the instructions in the memory of the PCM unit 16 associated with each light valve resulting in data transmission to the circuit 20. This data, in a quasi-binary format, is converted to true binary format in accordance with instructions stored in the non-volatile memory 28.

The new signals are then used to produce high resolution vane positioning through servo-control of the vane motor 56. With the present system an existing printer with solenoid driven light valves can be converted to the improved system while preserving a maximum amount of existing equipment including preprogrammed tapes for tape readers, tape readers, control panels, drive equipment, lens systems, and mechanical equipment.

It should be understood that numerous modifications of the invention described herein can be devised by those skilled in the art that fall within the spirit and scope of the principles of this invention, even if the invention is not practiced as specifically described herein.

What is claimed and desired to be secured by Letters Patent of the United States is:

1. A photographic light control device comprising:
   a set of three identical valves, each including a pair of control vanes;
   electronic means for reading light control information from a permanent storage medium and storing light control signals relating to each of the three primary colors;
   electronic means for storing a command sequence for converting quasi-binary color signals received by said device into true binary color signals;
   means for initiating the execution of said light control signals stored in said electronic storing means by said light valves, said initiating means including means for sequentially addressing and transferring light correction data to each of said light valves;
   digital to analog conversion means for converting said true binary coded signals to analog position control signals for positioning said light valve vanes in accordance with said light control signals; and
   each of said light valves further including switch means settable to one of three positions for enabling said valve to receive information relating to only one of the three primary colors from said sequential transfer means.

2. The device of claim 1 including a servo-control circuit for varying the position of said vanes.

3. The device of claim 2 wherein said light valve includes a motor geared to each of said vanes, said motor having a shaft, said light valve further including a position feedback potentiometer mounted on said shaft adjacent said motor.

4. The device of claim 1 including means for accepting manual trim inputs and for converting said inputs into signals for controlling the vane position.

5. The device of claim 1 including means for connecting said device to existing solenoid controlled printers.

6. The device of claim 1 wherein said digital to analog conversion means includes means for selecting the data relating to one of three primary colors from multiplexed data relating to all three colors in response to receipt of a particular data select signal.

* * * * *